(12) United States Patent
Wait

(10) Patent No.: US 9,431,014 B2
(45) Date of Patent: Aug. 30, 2016

(54) INTELLIGENT PLACEMENT OF APPLIANCE RESPONSE TO VOICE COMMAND

(71) Applicant: General Electric Company, Schenectady, NY (US)

(72) Inventor: Keith Wesley Wait, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 469 days.

(21) Appl. No.: 13/950,623

(22) Filed: Jul. 25, 2013

(65) Prior Publication Data

US 2015/0032456 A1    Jan. 29, 2015

(51) Int. Cl.
| | |
|---|---|
| G10L 15/26 | (2006.01) |
| G10L 21/0216 | (2013.01) |
| G10L 15/22 | (2006.01) |
| H04L 12/28 | (2006.01) |
| G01S 5/18 | (2006.01) |
| G01S 5/26 | (2006.01) |

(52) U.S. Cl.
CPC ............. *G10L 15/22* (2013.01); *G01S 5/18* (2013.01); *G10L 15/26* (2013.01); *H04L 12/282* (2013.01); *G01S 5/26* (2013.01); *G10L 2015/223* (2013.01); *G10L 2021/02166* (2013.01)

(58) Field of Classification Search
CPC ............. G10L 15/22; G10L 15/26; G10L 2021/02166; H04R 2430/20
See application file for complete search history.

(56) References Cited

U.S. PATENT DOCUMENTS

| | | | | |
|---|---|---|---|---|
| 6,988,070 B2* | 1/2006 | Kawasaki | ............... | G10L 15/26 704/270 |
| 7,139,716 B1* | 11/2006 | Gaziz | .................. | H04L 12/2803 704/231 |
| 8,340,975 B1* | 12/2012 | Rosenberger | ........... | G10L 15/22 704/270 |
| 8,825,020 B2* | 9/2014 | Mozer | ................... | H04L 12/282 379/102.01 |
| 8,831,761 B2* | 9/2014 | Kemp | ................... | G10L 19/008 370/260 |
| 9,142,242 B1* | 9/2015 | Peters | ................ | H04N 5/23203 |
| 2002/0077772 A1* | 6/2002 | Squibbs | .................. | G10L 15/26 702/159 |

(Continued)

FOREIGN PATENT DOCUMENTS

| | | |
|---|---|---|
| EP | 1154406 A1 | 2/2001 |
| KR | 10-2005094250 A | 9/2005 |
| WO | WO 2006135758 A1 | 12/2006 |

*Primary Examiner* — Samuel G Neway
(74) *Attorney, Agent, or Firm* — Dority & Manning, P.A.

(57) ABSTRACT

Systems and methods for intelligent placement of appliance response to a voice command are provided. An exemplary system includes a plurality of appliances. An exemplary method includes connecting each of the plurality of appliances over a local area network and generating a location map providing a location of each of the plurality of appliances. The method includes receiving the human voice signal at a plurality of microphones respectively included in the plurality of appliances and determining an originating location of the human voice signal based at least in part on the location map. The method includes selecting one of the plurality of appliances to respond to the human voice signal based at least in part on the location map and the originating location.

18 Claims, 10 Drawing Sheets

(56) References Cited

U.S. PATENT DOCUMENTS

| | | | | |
|---|---|---|---|---|
| 2002/0082835 | A1* | 6/2002 | Squibbs | G10L 15/26 704/270 |
| 2003/0144845 | A1* | 7/2003 | Lee | G10L 15/22 704/275 |
| 2005/0152557 | A1* | 7/2005 | Sasaki | H04S 7/302 381/58 |
| 2009/0065578 | A1* | 3/2009 | Peterson | G05B 19/048 235/382 |
| 2009/0076827 | A1* | 3/2009 | Bulitta | 704/275 |
| 2011/0254683 | A1* | 10/2011 | Soldan | G01S 19/49 340/539.13 |
| 2012/0212680 | A1 | 8/2012 | Kohanek | |
| 2012/0263020 | A1* | 10/2012 | Taylor | G01S 5/18 367/124 |
| 2013/0073293 | A1* | 3/2013 | Jang | G10L 15/22 704/275 |
| 2013/0102324 | A1* | 4/2013 | Qiu | H04W 4/023 455/456.1 |
| 2013/0156198 | A1* | 6/2013 | Kim | H04R 1/323 381/17 |
| 2013/0238326 | A1* | 9/2013 | Kim | G06F 3/167 704/231 |
| 2014/0079223 | A1* | 3/2014 | Nguyen | G01S 5/26 381/18 |
| 2014/0195233 | A1* | 7/2014 | Bapat | G10L 15/30 704/246 |
| 2014/0330569 | A1* | 11/2014 | Kolavennu | G10L 21/16 704/275 |
| 2015/0032456 | A1* | 1/2015 | Wait | G10L 15/22 704/275 |

* cited by examiner

INTELLIGENT PLACEMENT OF APPLIANCE RESPONSE TO VOICE COMMAND

FIELD OF THE INVENTION

The present disclosure relates to appliances. More particularly, the present disclosure relates to systems and methods for intelligent placement of an appliance response to a voice command

BACKGROUND OF THE INVENTION

Recent advancements in the ability of computing systems to recognize and understand human speech has led to the increased use and availability of computer-based personal assistants or other speech-interactive computing systems. In particular, certain "smart" appliances are beginning to incorporate advanced features able to directly respond to user voice requests. For example, an appliance can perform a requested action or operation or can use a speaker and/or digital display to provide a response to a voice request.

However, from the user's perspective, the increasing presence of such feature-rich appliances can undesirably increase the complexity of interacting with a single appliance in an environment where several of such appliances are present, such as a kitchen. For example, multiple smart appliances can detect a user voice command and attempt to simultaneously respond. Thus, a command that is directed to only a single appliance may elicit an response from multiple appliances, requiring the user to expend additional effort in remediating the unintended responses.

Further, various smart features can be spread across multiple appliances. However, the user can be unaware of the particular capabilities of each appliance. Thus, the user may be unsure of which appliance to direct a particular command or request.

As another example, the user may wish to interact with the most proximate appliance, for example because the user is engaged in performing a task such as cooking, but in fact desire to elicit a response from an appliance that is not the most proximate. In such case, a voice signal may fail reach its desired target with sufficient clarity.

Therefore, there is an increased consumer desire for improved systems and methods that allow groupings of appliances to provide smart features in a more intelligent and intuitive fashion. In particular, improved systems and methods for intelligent placement of an appliance response to a human voice signal are desirable.

BRIEF DESCRIPTION OF THE INVENTION

Aspects and advantages of the invention will be set forth in part in the following description, or may be obvious from the description, or may be learned through practice of the invention.

One aspect of the present disclosure is directed to a method for operating a system to respond to a human voice signal. The system includes a plurality of appliances. The method includes connecting each of the plurality of appliances over a local area network and generating a location map providing a location of each of the plurality of appliances. The method includes receiving the human voice signal at a plurality of microphones respectively included in the plurality of appliances and determining an originating location of the human voice signal based at least in part on the location map. The method includes selecting one of the plurality of appliances to respond to the human voice signal based at least in part on the location map and the originating location.

Another aspect of the present disclosure is directed to a system for responding to a human voice signal. The system includes a plurality of appliances in communication over a local area network. Each of the plurality of appliances includes a processor, a memory, a speaker, and at least one microphone. At least one of the plurality of appliances is configured to generate a location map based on a plurality of audio signals respectively transmitted by the plurality of appliances. The location map describes a position for each of the plurality of appliances.

Another aspect of the present disclosure is directed to a device for use in a system configured to respond to a human voice signal. The system includes a plurality of appliances. The device includes a processor, a memory, and a network interface for communicating with the system over a local area network. The device is configured to perform operations. The operations include determining a location map describing a location for each of the plurality of appliances based on a plurality of audio signals respectively transmitted by the plurality of appliances. The operations include determining an originating location of the human voice signal based at least in part on the location map and selecting one of the appliances to respond to the human voice signal based at least in part on the location map and the originating location.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
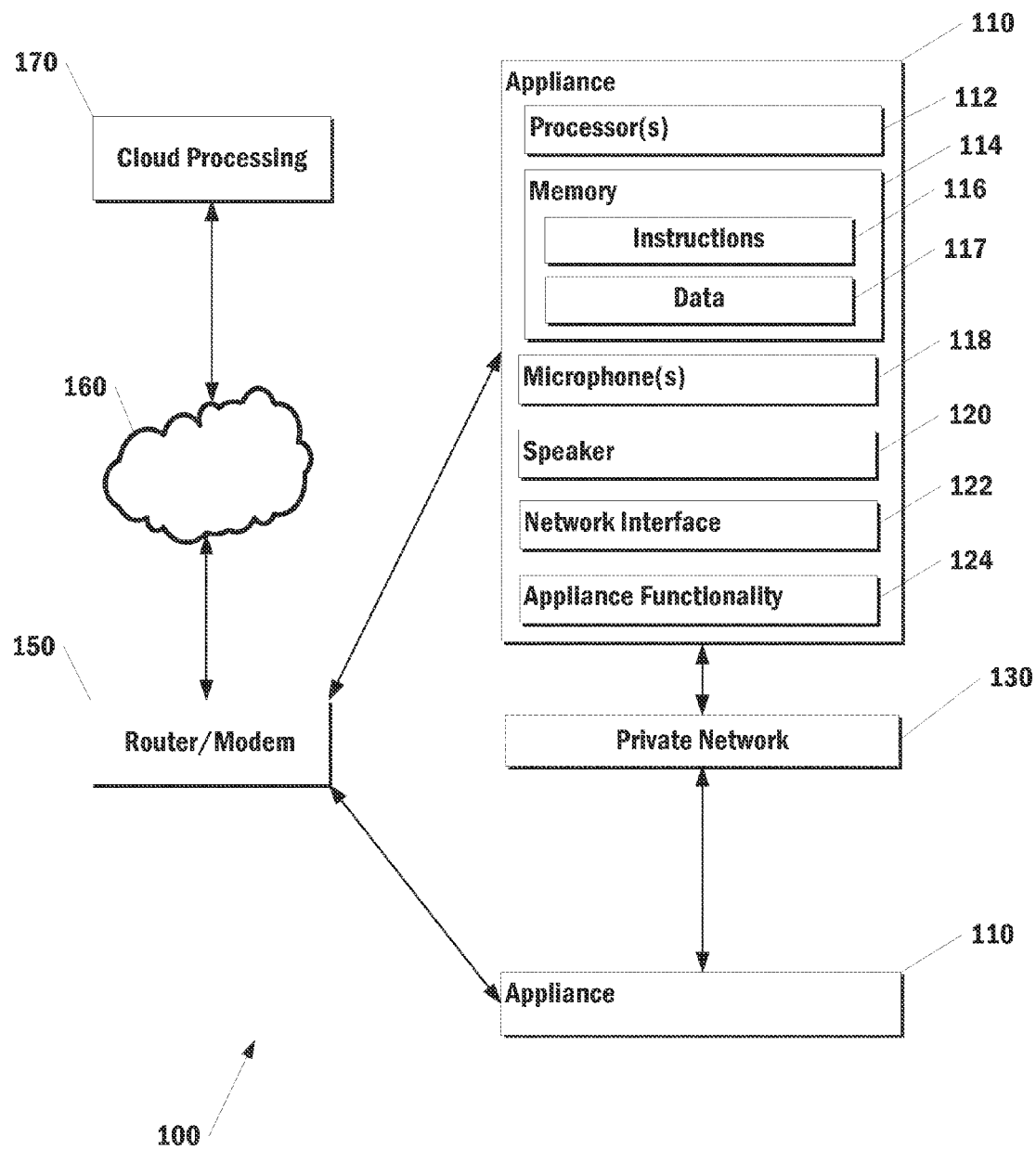
FIG. 1 depicts an exemplary system for responding to a human voice signal according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to systems and methods for responding to a user voice command in a more intelligent and intuitive fashion. In particular, a system of the present disclosure can include a plurality of appliances in communication over a local area network. The appliances can be configured to perform one or more automatic localization routines that result in a location map describing the relative locations of all appliances. For example, a localization routine can include transmitting and receiving audio signals among the appliances.

Once the location map is determined, a plurality of microphones included in the plurality of appliances form a cooperative array for detecting and receiving human voice signals. Knowledge of the respective position of each microphone in the array can be used to determine an originating location for the received voice signal. Furthermore, spatial filtering, such as a beamforming technique, can be used to improve the quality of the voice signal.

By determining the location of the user relative to each of the appliances, the systems and methods of the present disclosure can provide for a more intelligent and intuitive response to a user command or query. As an example, the most proximate appliance that can satisfy the command or query can be selected to provide or perform the appropriate response to the user command.

With reference now to the FIGS., exemplary embodiments of the present disclosure will now be discussed in detail. FIG. 1 depicts an exemplary system 100 for responding to a human voice signal according to an exemplary embodiment of the present disclosure. System 100 includes a plurality of appliances 110. Although two appliances 110 are shown, any number of appliances 110 can be included in system 100. Appliances 110 can communicate over a local area network. For example, appliances 110 can communicate over a private network 130 or can communicate via a router 150. In conjunction with a modem, router 150 can provide communications with cloud processing capabilities 170 over a wide area network 160, such as the Internet.

Each appliance 110 can include one or more processors 112, a memory 114, one or more microphones 118, and a speaker 120. Appliance 110 can also include a network interface 122, and can provide appliance functionality 124. As used herein, an appliance can be any machine or device for performing a specific task, including, without limitation, an air conditioner, an HVAC system controller, a security system, a ceiling fan, a clothes dryer, a clothes washer, a stereo system, a dishwasher, a refrigerator, a heater, a lighting system, a stove, an oven, a smoke detector, a television, a thermostat, a water heater, a humidity or temperature control device, an ice maker, a garbage disposal, a renewable energy system, an energy storage or delivery system, or any other suitable appliance.

The processor(s) 112 can be any suitable processing device, such as a microprocessor, microcontroller, integrated circuit, or other suitable processing device. The memory 114 can include any suitable computing system or media, including, but not limited to, non-transitory computer-readable media, RAM, ROM, hard drives, flash drives, or other memory devices. The memory 114 can store information accessible by processor(s) 112, including instructions 116 that can be executed by processor(s) 112 to control various components of appliance 110 to provide appliance functionality 124. Memory 114 can also store data 117.

According to an aspect of the present disclosure, processor(s) 112 can implement various modules included in instructions 116 in order to implement aspects of the present disclosure. For example, in one embodiment, appliance 110 can implement various modules to perform aspects of methods (200), (300), (1000), (1300), and (1400) of FIGS. 2, 3, 10, 13, and 14.

It will be appreciated that the term "module" refers to computer logic utilized to provide desired functionality. Thus, a module can be implemented in hardware, application specific circuits, firmware and/or software controlling a general purpose processor. In one embodiment, modules are program code files stored on the storage device, loaded into memory and executed by a processor or can be provided from computer program products, for example computer executable instructions, that are stored in a tangible computer-readable storage medium such as RAM, hard disk or optical or magnetic media.

Microphone(s) 118 can be any suitable device or circuitry for converting received audio signals into an electrical signal or other computer-readable format. For example, microphone(s) 118 can include an acoustic-to-electric transducer or other sensor.

As used herein, the term audio signal includes mechanical waves that are an oscillation of pressure transmitted through a medium. Acceptable frequencies of audio signals are not necessarily defined by the range of human hearing or perception. Thus, audio signals can have frequencies generally undetectable by human hearing. For example, audio signals can include audible signals, ultrasonic signals, and subsonic signals.

Speaker 120 can be any device that produces an audio signal based on a received electrical signal. For example, speaker 120 can include an electric-to-acoustic transducer.

Network interface 122 can include any suitable components for interfacing with one more networks, including for example, transmitters, receivers, ports, controllers, antennas, or other suitable components.

According to an aspect of the present disclosure, appliances 110 can be connected over a private network 130. Private network 130 can provide network communications according to any suitable protocol. For example, private network 130 can be a Wi-fi network, a Wi-fi Direct network, a Bluetooth network, a Zigbee network, short-range radio communication network, or any other suitable form of private network. In some implementations, one of the appliances 110 can create, maintain, and moderate private network 130.

System 100 can further include a router 150 which provides routing and serves as a wireless access point for a wireless local area network. In conjunction with a modem, router 150 can provide communications with cloud processing capabilities 170 over a wide area network 160, such as the Internet. One of skill in the art will appreciate the structure, capabilities, and operation of router/modem 150.

Cloud processing 170 can include any form of processing or higher order intelligence provided over wide area network 160. For example, cloud processing 170 can be provided by one or more servers implementing instructions from memory. According to an aspect of the present disclosure, cloud processing 170 can be used to decode, parse, or otherwise provide intelligence to comprehend a received human voice signal. For example, cloud processing 170 can receive an uploaded voice signal and return one or more required parameters or functionalities or instructions defining an appropriate response to the voice signal.

In some embodiments, system 100 can optionally further include a home energy management device (not shown) to provide additional functionality and interactivity to the system. For example, the home energy management device can be any device or combination of devices that allow for energy management functionality, such as viewing or analyzing energy consumption data, regulating appliance runtime, responding to or acting upon demand requests from a utility provider, providing out-of-range user control of appliances, enabling inter-appliance communication, or other energy management functionality, including implementing the systems and methods of the present disclosure.

As an example, the home energy management device can be a stand-alone device that plugs into a wall socket and wirelessly communicates with any smart appliances over a local area network. As another example, the home energy management device can be a computing device such as a general purpose computer, smartphone, PDA, laptop, tablet, mobile device, or other suitable computing device implementing a home energy management application. As yet another example, home energy management device can be implemented as a component or feature of a smart meter.

It should also be appreciated that while the present disclosure is particularly directed to systems that include a plurality of home appliances, the present disclosure can also be applied to systems optimized for other facilities, including, without limitation, commercial and public facilities. Thus in the context of the present disclosure, the use of the terms "home" or "house" is fully intended to include other structures whether used as a residential facility or for some other purpose.

Figure 2:
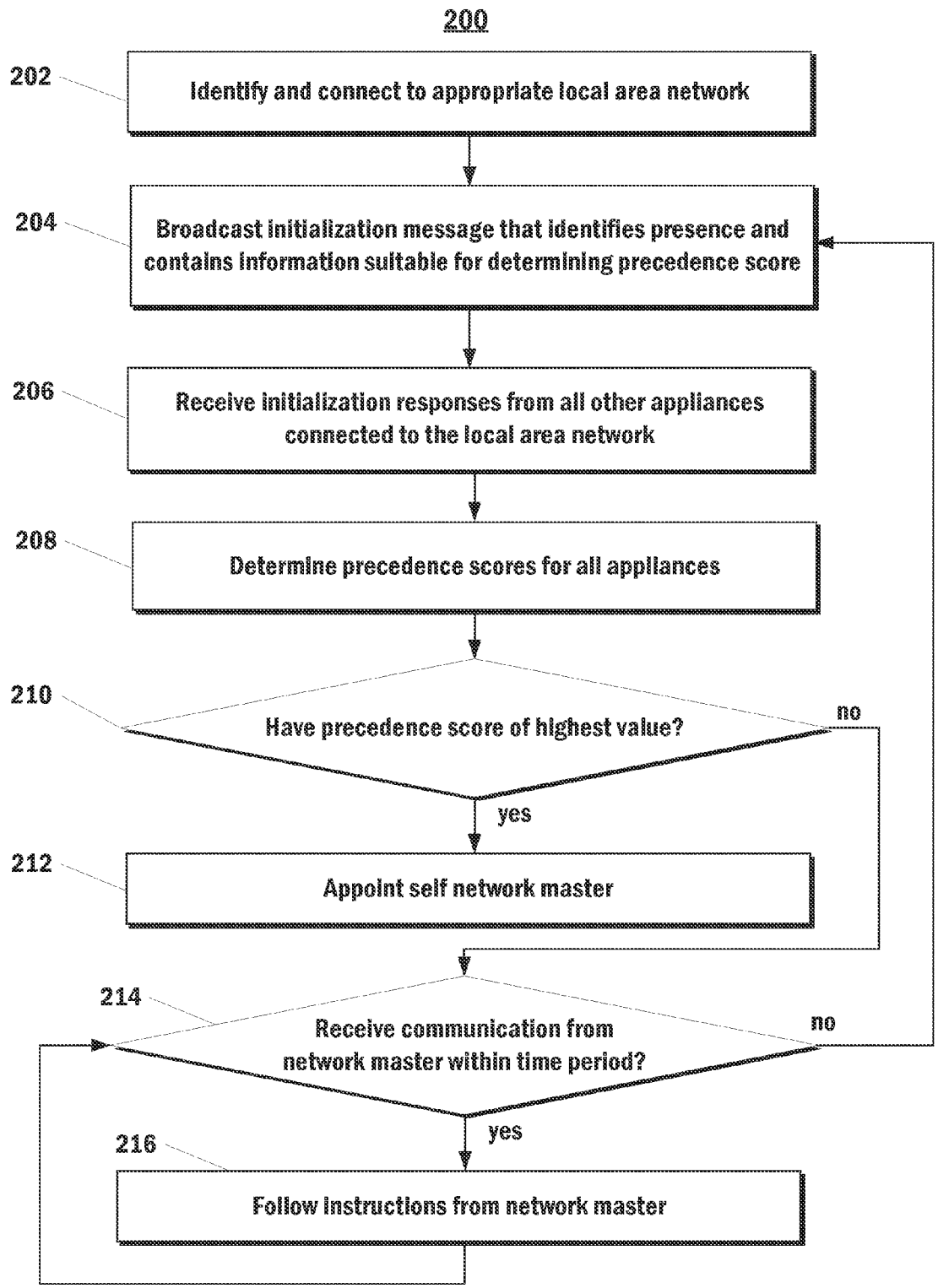
FIG. 2 depicts an exemplary method for connecting an appliance to a multi-appliance system over a local area network according to an exemplary embodiment of the present disclosure.

FIG. 2 depicts an exemplary method (200) for connecting an appliance to a multi-appliance system over a local area network according to an exemplary embodiment of the present disclosure. Method (200) can be implemented using any suitable appliance or other device, including, for example, appliance 110 of FIG. 1. In addition, FIG. 2 depicts steps performed in a particular order for purposes of illustration and discussion. Those of ordinary skill in the art, using the disclosures provided herein, will understand that the various steps method (200) can be omitted, adapted, and/or rearranged in various ways.

At (202) the appliance can identify and connect to an appropriate local area network. As an example, upon powering up, an appliance can use its wireless communication mechanism or network interface to determine if it is currently connected or can be connected to an existing appliance network. For example, the appliance can search to identify available networks or the presence other appliances by looking for a predetermined identifier. The identifier can be included in the network SSID or can otherwise be broadcasted. The identifier can indicate that the network is hosted by a system-compatible appliance or otherwise indicate an appliance's identity and presence.

If a suitable network is identified, the appliance can join or request to join the network. The appliance can perform any required network connection procedures, including security procedures. In some implementations, if an existing network is not detected at (202), then the appliance can create a new network and wait for other appliances to join.

Upon connection to the local area network, the appliance can broadcast an initialization message at (204). The initialization message can serve as an announcement of the appliance's presence and can contain information suitable for determining a precedence score for the appliance.

More particularly, according to an aspect of the present disclosure, a precedence score can be calculated for or provided by each appliance connected to the local area network. The precedence scores can be used to determine operating aspects of the network, including allocation of processing or computing tasks and a network hierarchy used for determining order of communication.

The appliance's precedence score can be stored in memory and included in the initialization message broadcasted at (204). Alternatively, the initialization message can simply contain information sufficient to calculate the appliance's precedence score.

As an example, the precedence score can be calculated from information such as an appliance category (e.g. oven, refrigerator, dishwasher), a processor model, and/or a hash of the appliance serial number. In particular, in some implementations, the hash of the appliance serial number can be used as a tie-breaker if there is a tie among appliances' precedence scores.

At (206) the appliance can receive an initialization response from each of the other appliances connected to the local area network. For example, each of the other appliances connected to the network can receive the initialization message broadcasted at (204), identify the received message as an initialization message, and respond with an initialization response. Each initialization response can provide the responding appliance's precedence score or provide the information sufficient to calculate its precedence score. Any other suitable information can be provided as well.

At (208) the appliance can determine, calculate, and/or consider the precedence scores for all appliances connected to the local area network. At (210) the appliance can determine whether its associated precedence score is the precedence score of highest value. If the appliance determines at (210) that it has the highest precedence score of all appliances connected on the local area network, then at (212) the appliance can appoint itself as the network master.

More particularly, according to an aspect of the present disclosure, the precedence scores associated with appliances present within the same system can be used to determine and select a network master. The network master can be responsible for initiating various routines or methods and for directing communications among the system. In some implementations, the network master performs the majority of data processing requirements for the system. Therefore, the precedence scores can be weighted to provide a higher score for appliances that include superior processors or processing capabilities.

However, if the appliance determines at (210) that it does not have the highest precedence score of all appliances connected on the local area network, then it can assume that the appliance having the higher score will act as the network master. Therefore, at (214) the appliance will pause for a time period and wait for instructions or other communications from the network master.

In particular, at (214) the appliance can determine whether it has received a communication from the network master within a predetermined time period. If the appliance determines that a communication from the network master has been received, then the appliance follows any instructions provided by the network master at (216), resets the time period, and returns to (214).

However, if the appliance determines at (214) that the time period has expired without having received any form of communication from the network master, then the appliance can assume that the network connection has been lost or that the network master has been rendered inoperable. Therefore, the appliance can return to (204) and rebroadcast its initialization message to restart the process of appointing a network master.

Figure 3:
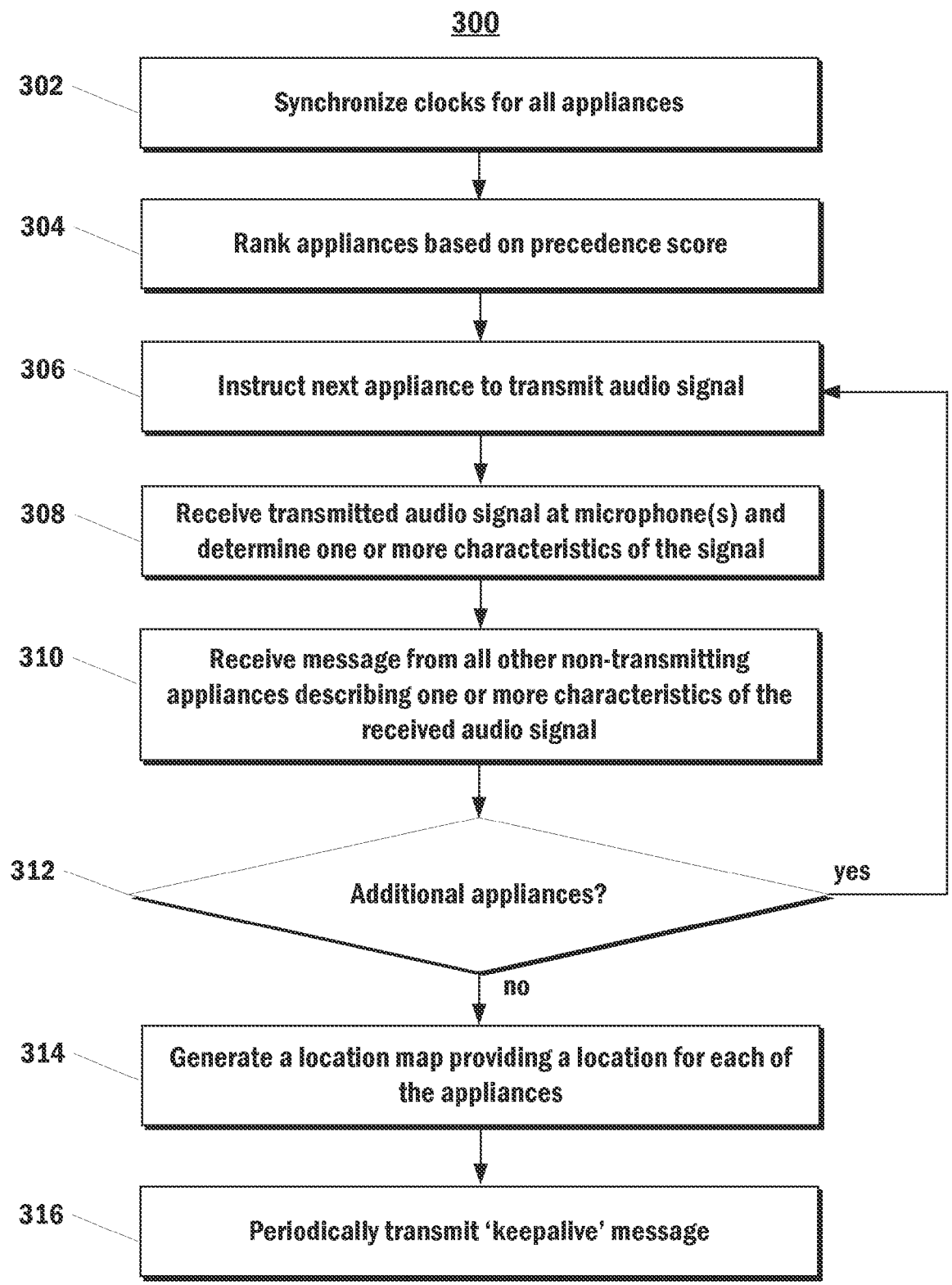
FIG. 3 depicts an exemplary method for generating a location map according to an exemplary embodiment of the present disclosure.

FIG. 3 depicts an exemplary method (300) for generating a location map according to an exemplary embodiment of the present disclosure. Method (300) can be implemented using any suitable appliance or other device, including, for example, appliance 110 of FIG. 1. In particular, method (300) can be performed by an appliance that has been designated as network master for a system of appliances.

In addition, FIG. 3 depicts steps performed in a particular order for purposes of illustration and discussion. Those of ordinary skill in the art, using the disclosures provided herein, will understand that the various steps of method (300) can be omitted, adapted, and/or rearranged in various ways.

At (302) the network master can operate to synchronize a plurality of internal clocks respectively included in the plurality of appliances. As an example, the well-known methods of Network Time Protocol can be employed to synchronize the clocks of all appliances. However, any other suitable clock synchronization protocols or algorithms can be employed at (302). Further, in some implementations, synchronization of all system clocks is not required.

At (304) the network master can rank all appliances based on precedence score. For example, the precedence scores can be compared at (304) to generate the ranking. Alternatively, the ranking can have previously been computed and stored and can be accessed at (304). Generally, the ranking can list from high scores to low scores.

At (306) the network master can instruct the next appliance in the rankings to transmit an audio signal. For example, the first iteration of (306) can result in the network master itself transmitting an audio signal, while later iterations require the network master to prompt the next appliance in the rankings via a message or other signal.

At (308) the network master can receive the transmitted audio signal at its microphone(s). More particularly, the appliance that received the instruction at (306) can transmit the audio signal using its speaker and such audio signal can be received at (308). Generally, step (308) is not performed when the network master is the transmitting device (i.e. the first iteration).

One or more characteristics of the received audio signal can also be determined at (308). As an example, a time of arrival of the audio signal can be determined and recorded. As another example, a direction of arrival of the audio signal can be determined and recorded.

At (310) the network master can receive messages from all other non-transmitting appliances. Each message can describe one or more characteristics of the audio signal as received at the respective appliance. As examples, the message from each non-transmitting appliance can provide a time of arrival and/or direction of arrival of the audio signal at that particular appliance.

Figure 4:
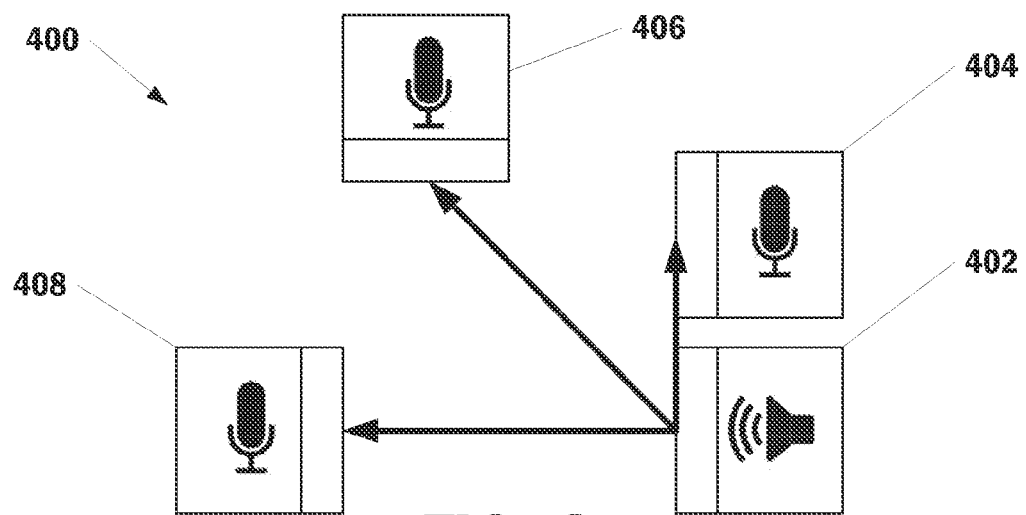
FIG. 4 depicts a graphical representation of an audio signal being transmitted among a plurality of appliances according to an exemplary embodiment of the present disclosure.

As an example of the above process, FIG. 4 depicts a graphical representation 400 of an audio signal being transmitted among a plurality of appliances according to an exemplary embodiment of the present disclosure. In particular, graphical representation 400 depicts an appliance 402 transmitting an audio signal using its speaker. The audio signal is then respectively received at appliances 404, 406, and 408 using their respective microphone(s).

As an example, appliance 406 can observe the audio signal at its microphone(s) and then transmit a message to the network master. The message sent by appliance 406 to the network master can describe one or more determined characteristics of the received audio signal, such as, for example, a time of arrival or a direction of arrival of the audio signal at appliance 406.

In addition, appliance 402 can send a message to the network master that specifies a time of transmission of the audio signal. In particular, the time of transmission of the audio signal from appliance 402 can be analyzed along with the respective times of arrival of the audio signal at each of appliances 404, 406, and 408 to determine respective distances from appliance 402 to each of appliances 404, 406, and 408.

Returning to FIG. 3, at (312) the network master can determine whether any additional appliances remain in the ranking generated at (304). If an additional appliance has not yet been instructed to transmit an audio signal, then the network master can return to (306) and instruct the next appliance to transmit an audio signal using its speaker.

In such fashion, each of the plurality of appliances included in the system is provided an opportunity to transmit an audio signal. Further, for each instance in which an appliance transmits an audio signal, the network master records its own reception data and receives reception data from all other non-transmitting appliances.

When it is determined at (312) that all appliances have transmitted an audio signal, then method (300) can proceed at (314). At (314) the network master can generate a location map. The location map can describe a location for each of the appliances included in the system.

According to aspects of the present disclosure, the location map can be generated based on the one or more characteristics determined for each audio signal received at each appliance, as reported to the network master. As examples, the one or more characteristics can include respective times of arrival and directions of arrival.

Figure 5:
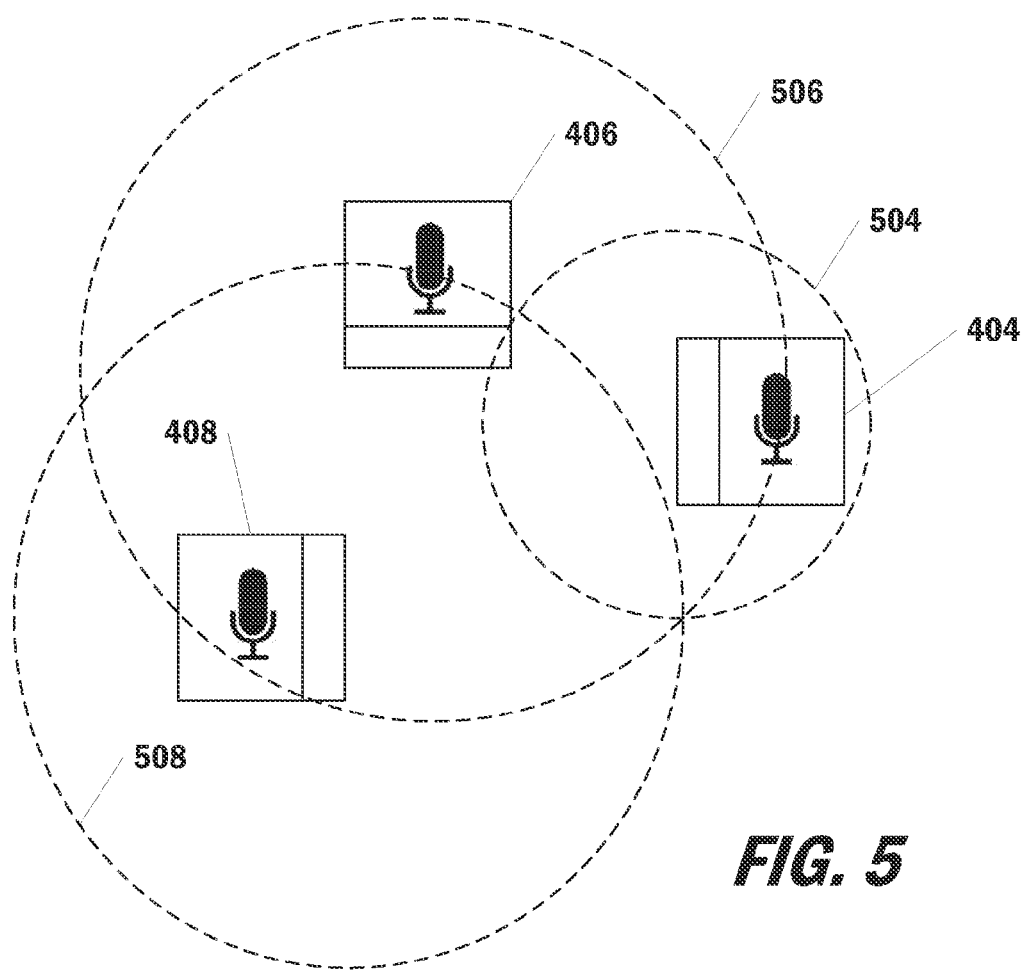
FIG. 5 depicts a graphical representation of a localization procedure according to an exemplary embodiment of the present disclosure.

As an example, FIG. 5 depicts a graphical representation 500 of a localization procedure according to an exemplary embodiment of the present disclosure. In particular, graphical representation 500 depicts location circles 504, 506, and 508 respectively associated with appliances 404, 406, and 408. The perimeter of each of location circles 504, 506, and 508 can represent potential locations for appliance 402 based on time of arrival data respectively determined by appliances 404, 406, and 408.

As an example, a time of transmission of the audio signal from appliance 402 and a time of arrival of the audio signal at appliance 406 can be analyzed together with knowledge of the speed of sound in air to calculate a distance between the two appliances. The calculated distance can be used as a radius to generate location circle 506.

It will be appreciated that location circles 504, 506, and 508 are based on transmission of an audio signal by appliance 402 only. Thus, additional location circles can be generated that describe potential locations for the other system appliances based upon additional transmissions of audio signals by such appliances.

As such, referring again to FIG. 3, repetition of steps (306)-(310) for each appliance connected to the local area network can result in sufficient data to generate a significant number of location circles or, similarly, distances between respective pairs of appliances such that the location map can be generated at (314).

As an example, the network master can perform a least squares analysis or other suitable data fitting analysis at (314) to synthesize all available data and generate the location map.

Thus, the location map can be generated at (314) by analyzing time of arrival data for each audio signal received at each appliance. According to another aspect of the present disclosure, the location map can be generated at (314) by determining a direction of arrival for each audio signal received at each appliance. In particular, each direction of arrival can be determined based on a time difference in reception between two microphones included in each receiving appliance. The two microphones can have a known configuration.

Figure 6:
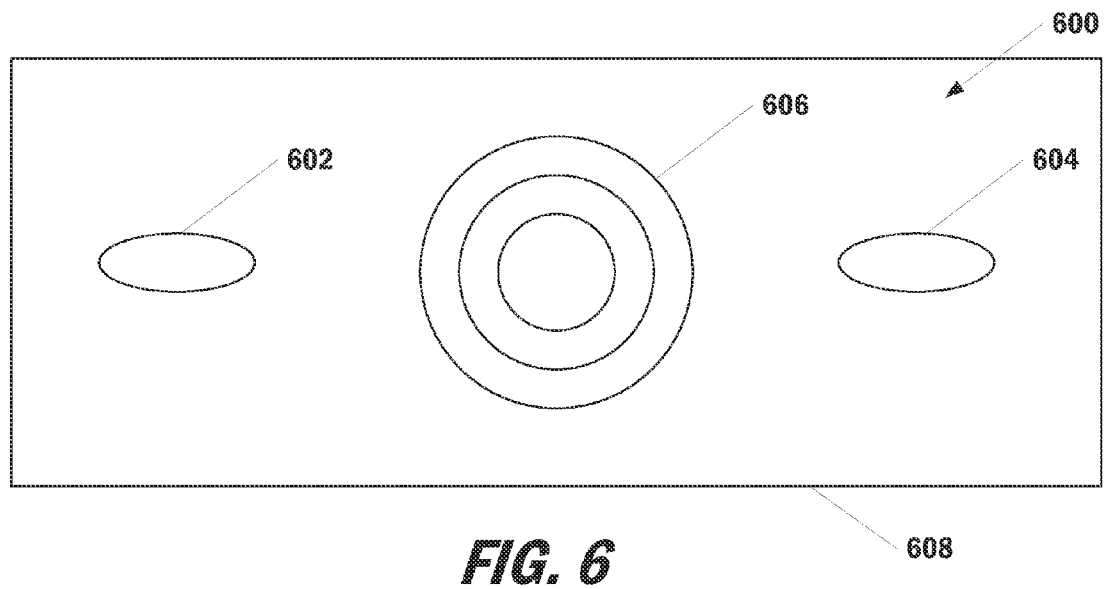
FIG. 6 depicts an exemplary appliance speaker and microphone configuration according to an exemplary embodiment of the present disclosure.

FIG. 6 depicts an exemplary appliance speaker and microphone configuration 600 according to an exemplary embodiment of the present disclosure. Configuration 600 can include two microphones 602 and 604 and a speaker 606 secured to a panel 608.

Panel 608 can be located on the front of the appliance or other location at which audio signals will be able to be transmitted and received with minimal distortion. Microphones 602 and 604 can positioned at an equivalent height to each other and can be spaced apart by a given distance, such as, for example, five inches.

Figure 7:
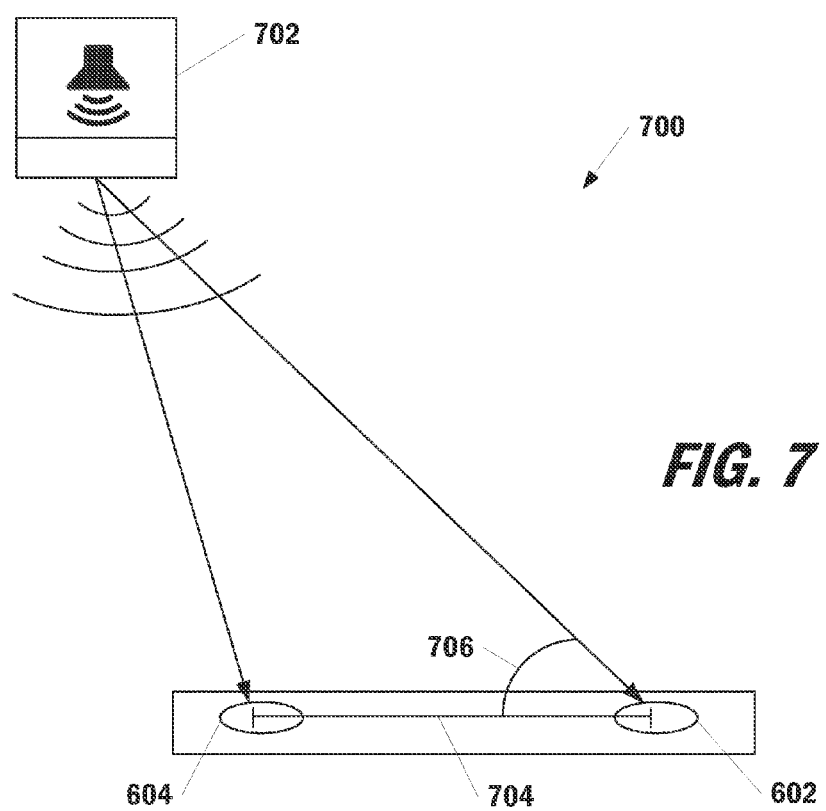
FIG. 7 depicts a graphical representation of an appliance microphone configuration receiving an audio signal according to an exemplary embodiment of the present disclosure.

FIG. 7 depicts a graphical representation 700 of an appliance microphone configuration receiving an audio signal according to an exemplary embodiment of the present disclosure. In particular, graphical representation 700 shows microphones 602 and 604 receiving an audio signal transmitted by appliance 702. Microphones 602 and 604 are separated by a known distance 704.

Due to the distance between microphone 604 and the speaker of appliance 702 being less than the distance between microphone 602 and the speaker of appliance 702, the audio signal will be received at microphone 604 at an earlier time than the audio signal will be received at microphone 602. In particular, the audio signal will be observed at microphone 604 at time t while the audio signal will be observed at microphone 602 at time t+d, where d represents a measurable time difference.

As will be understood by one of skill in the art, a direction of arrival of the audio signal can be determined based on the time difference of arrival d, the speed of sound in air, and the known distance 704 between microphones 604 and 602. In particular, in some implementations, the determined direction of arrival can be equal to an angle of arrival 706.

Figure 8:
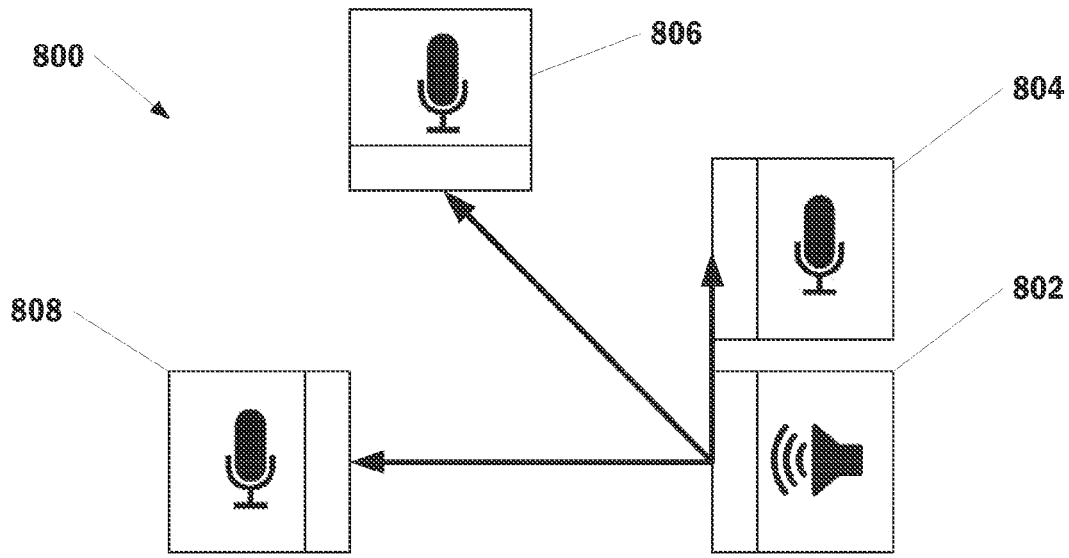
FIG. 8 depicts a graphical representation of an audio signal being transmitted among a plurality of appliances according to an exemplary embodiment of the present disclosure.
Figure 9:
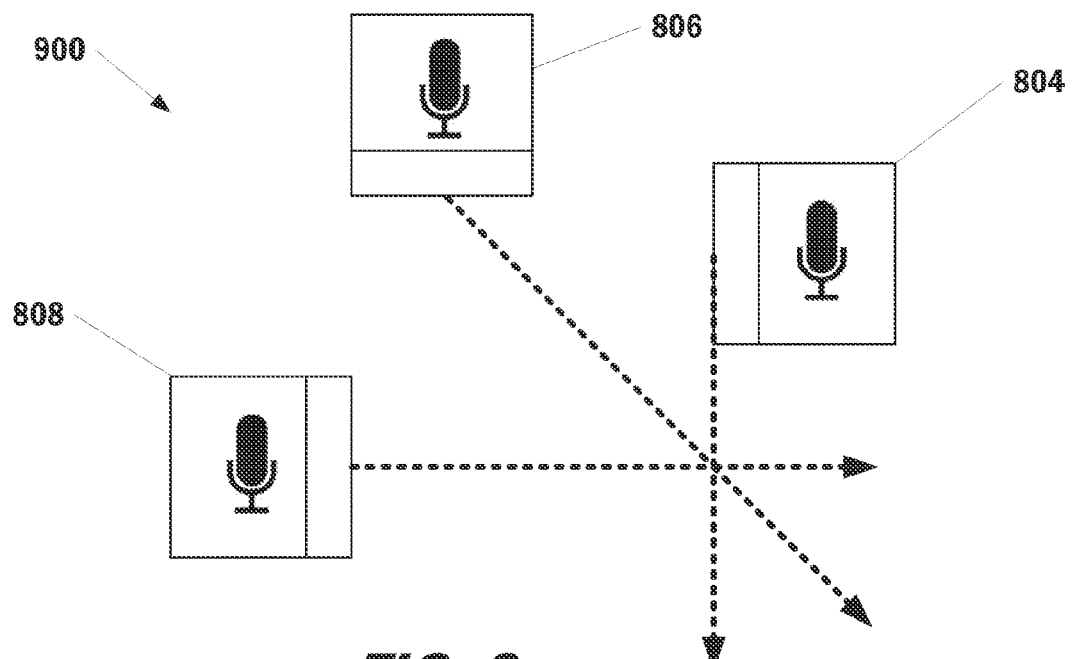
FIG. 9 depicts a graphical representation of a localization procedure according to an exemplary embodiment of the present disclosure.

FIGS. 8 and 9 provide an example of a localization procedure leveraging the principles disclosed above. FIG. 8 depicts a graphical representation 800 of an audio signal being transmitted among a plurality of appliances according to an exemplary embodiment of the present disclosure. In particular, graphical representation 800 depicts an appliance 802 transmitting an audio signal using its speaker. The audio signal is then respectively received at appliances 804, 806, and 808 using their respective microphone(s).

As an example, appliance 806 can observe the audio signal at its microphone(s) and then transmit a message to the network master. The message sent by appliance 806 to the network master can describe the direction of arrival of the audio signal at appliance 806. Alternatively, the message can provide information sufficient to permit the network master to calculate of the direction of arrival of the audio signal at appliance 806, such as the time difference of arrival d.

FIG. 9 depicts a graphical representation 900 of a localization procedure according to an exemplary embodiment of the present disclosure. In particular, graphical representation 900 depicts directions of arrival 904, 906, and 908 respectively associated with appliances 804, 806, and 808.

It will be appreciated that directions of arrival 904, 906, and 908 are based on transmission of an audio signal by appliance 802 only. Thus, additional directions of arrival can be generated that describe potential locations for the other system appliances based upon additional transmissions of audio signals by such appliances.

As such, referring again to FIG. 3, repetition of steps (306)-(310) for each appliance connected to the local area network can result in sufficient data to generate a significant number of directions of arrival or, similarly, estimated directions between respective pairs of appliances such that the location map can be generated at (314).

As an example, the network master can perform a least squares analysis or other suitable data fitting analysis at (314) to synthesize all available data and generate the location map.

After the network master generates the location map at (314), then at (316) the network master can periodically transmit a 'keepalive' message. Each 'keepalive' message can indicate that the network is stable and that current operations should be continued. If one of the other appliances on the network does not receive the 'keepalive' message, it will broadcast an initialization message, potentially restarting the network master selection and localization processes. The 'keepalive' message can also be used to resynchronize all system clocks.

Figure 10:
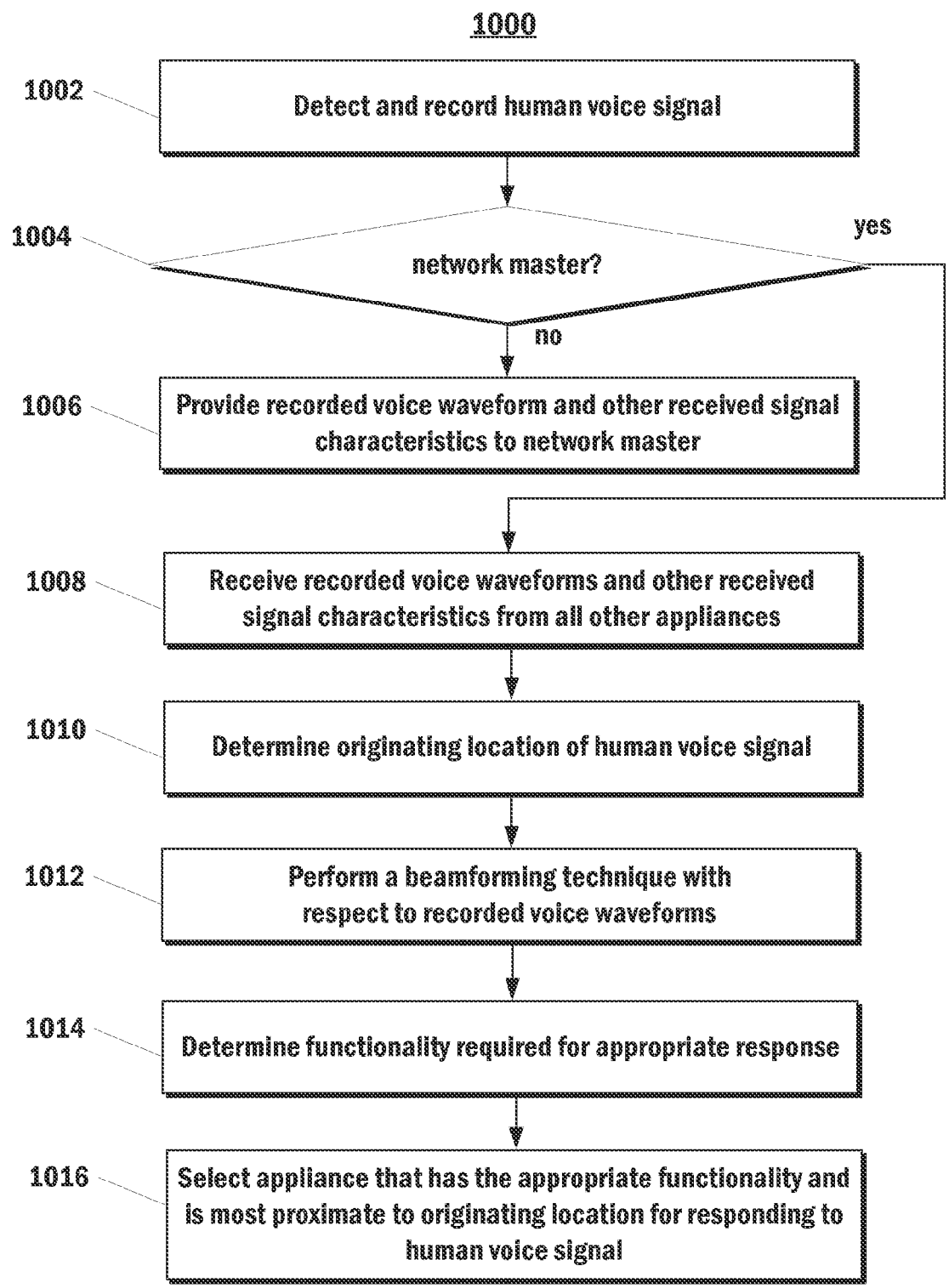
FIG. 10 depicts an exemplary method for responding to a human voice signal according to an exemplary embodiment of the present disclosure.

FIG. 10 depicts an exemplary method (1000) for responding to a human voice signal according to an exemplary embodiment of the present disclosure. Method (1000) can be implemented using any suitable appliance or other device, including, for example, appliance 110 of FIG. 1.

In addition, FIG. 10 depicts steps performed in a particular order for purposes of illustration and discussion. Those of ordinary skill in the art, using the disclosures provided herein, will understand that the various steps method (1000) can be omitted, adapted, and/or rearranged in various ways.

At (1002) the appliance can detect and record a human voice signal. For example, the appliance can receive the human voice signal at its microphone(s) and generate a recorded voice waveform. One or more characteristics of the received voice signal, such as a time of arrival or a direction of arrival can be determined at (1002) as well.

At (1004) the appliance can determine whether it is currently appointed as network master. If the appliance determines that it is not the network master, then at (1006) the appliance can provide the recorded voice waveform and any other received signal characteristics to the network master.

However, if the appliance determines at (1004) that it is the network master, then at (1008) the appliance, as network master, can respectively receive a recorded voice waveform and other received signal characteristics, such as time or direction of arrival, from each of the other appliances connected over the network.

At (1010) the network master can determine an originating location of the human voice signal. In particular, the originating location of the human voice signal can be determined based on an analysis of the plurality of voice signal characteristics respectively determined by the plurality of appliances on the network. For example, FIGS. 11 and 12 depict reception of a human voice signal by a plurality of appliances and the resulting determination of the originating location.

Figure 11:
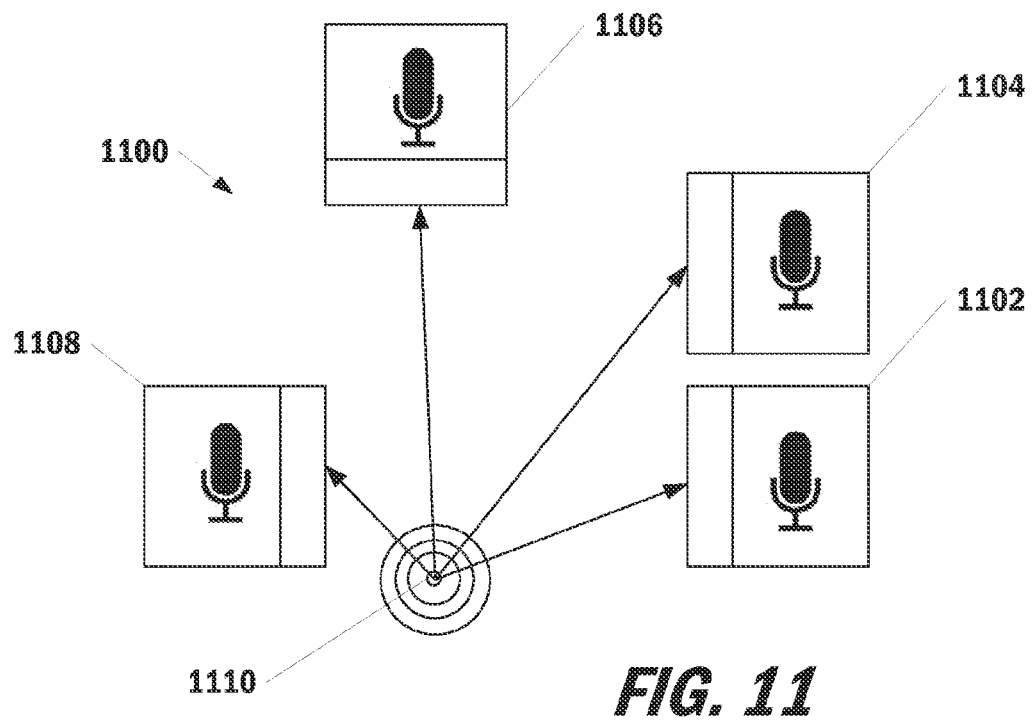
FIG. 11 depicts a graphical representation of a human voice signal being received by a plurality of appliances according to an exemplary embodiment of the present disclosure.

FIG. 11 depicts a graphical representation 1100 of a human voice signal being received by a plurality of appliances according to an exemplary embodiment of the present disclosure. In particular, the human voice signal is emitted at an originating location 1110 and received by one or more microphones associated with each of appliances 1102, 1104, 1106, and 1108.

Figure 12:
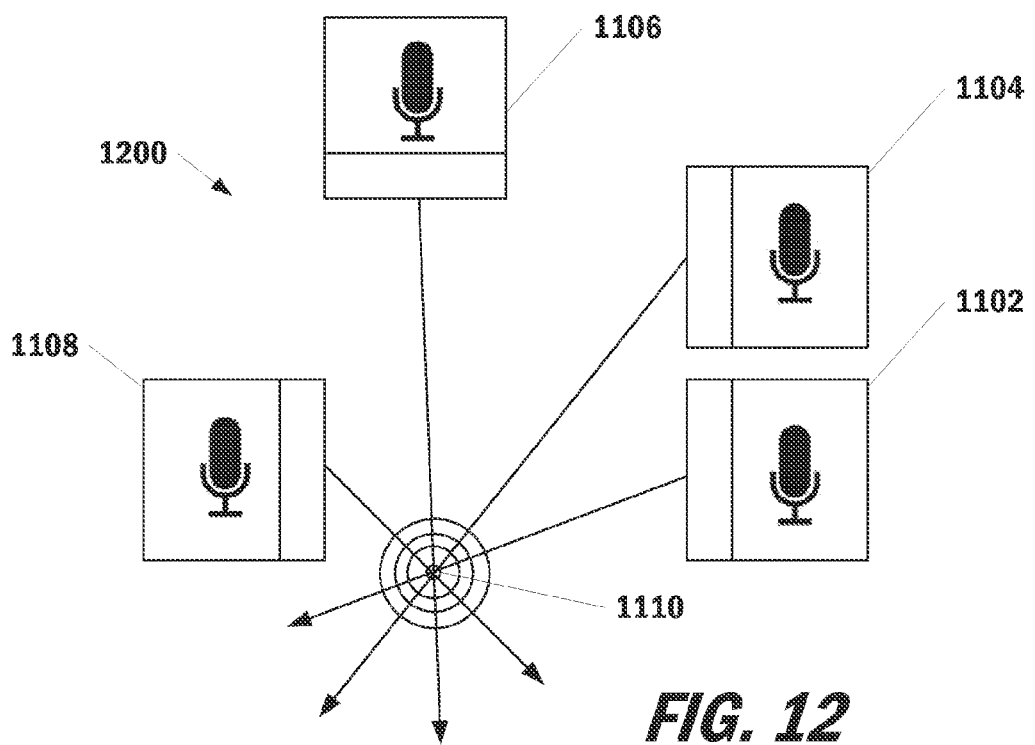
FIG. 12 depicts a graphical representation of a plurality of appliances determining an originating location of a human voice signal according to an exemplary embodiment of the present disclosure.

FIG. 12 depicts a graphical representation 1200 of a plurality of appliances determining the originating location 1110 of a human voice signal according to an exemplary embodiment of the present disclosure.

As shown in FIG. 12, a direction of arrival of the human voice signal can be determined for each of appliances 1102, 1104, 1106, and 1108. In particular, each of appliances 1102, 1104, 1106, and 1108 can include two or more microphones and a time difference in reception between the microphones can be used to determine the direction of arrival of the human voice signal, as illustrated in and discussed with respect to FIGS. 6 and 7. In addition, the respective position of each of appliances 1102, 1104, 1106, and 1108 can have been previously determined and, therefore, provided by a location map.

Thus, the network master can determine the originating location of the human voice signal by analyzing the location map in combination with the plurality of directions of arrival respectively determined for appliances 1102, 1104, 1106, and 1108, as illustrated in FIG. 12. A least squares analysis or other data fitting technique can be performed to solve for the originating location in the event that the directions of arrival present an over-constrained system.

Returning to FIG. 10, the network master can also determine the originating location of the human voice signal at (1010) by analyzing a location map in combination with the time of arrival of the human voice signal at each of appliances on the network. Thus, knowledge of the position of each of the appliances can be combined with the respective times of arrival of the human voice signal at each appliance to determine the originating location of the signal. A least squares analysis or other data fitting technique can be performed to solve for the originating location in the event that the times of arrival present an over-constrained system.

At (1012) a beamforming technique can be performed with respect to the plurality of recorded voice waveforms. For example, the network master can perform the beamforming technique. Alternatively, the recorded voice waveforms can be uploaded to for cloud processing at a server, including performance of a beamforming technique.

One of skill in the art will understand the operation of such a beamforming technique. In particular, knowledge of the originating location, as determined at (1010), can be used to instruct the beamforming process to combine and/or weight the recorded voice waveforms so that extraneous noise is filtered from the human voice signal.

The result of (1012) can be a beamformed version of the human voice signal that is higher in quality or otherwise easier to process by speech-analysis computers. In addition, other filtering such as frequency filtering or additional forms of spatial filtering can be performed as well.

One benefit of performing such beamforming technique is that expensive, high-quality microphones are not required to be provided in each and every appliance. Instead, filtering methods can be performed to obtain a high quality voice signal from the array of cooperative microphones. However, beamforming the human voice signal is not a strictly required feature of the present disclosure.

At (1014) the human voice signal can be deciphered or processed to determine one or more appliance functionalities required for an appropriate response to the voice command. Exemplary functionalities include particular appliance categorizations or components.

At (1016) the network master can select the appliance that possesses the required functionalities determined at (1014) and is most proximate to the originating location determined at (1010) to respond to the human voice signal. The network master can provide any required instructions or prompt to perform an appropriate response.

Figure 13:
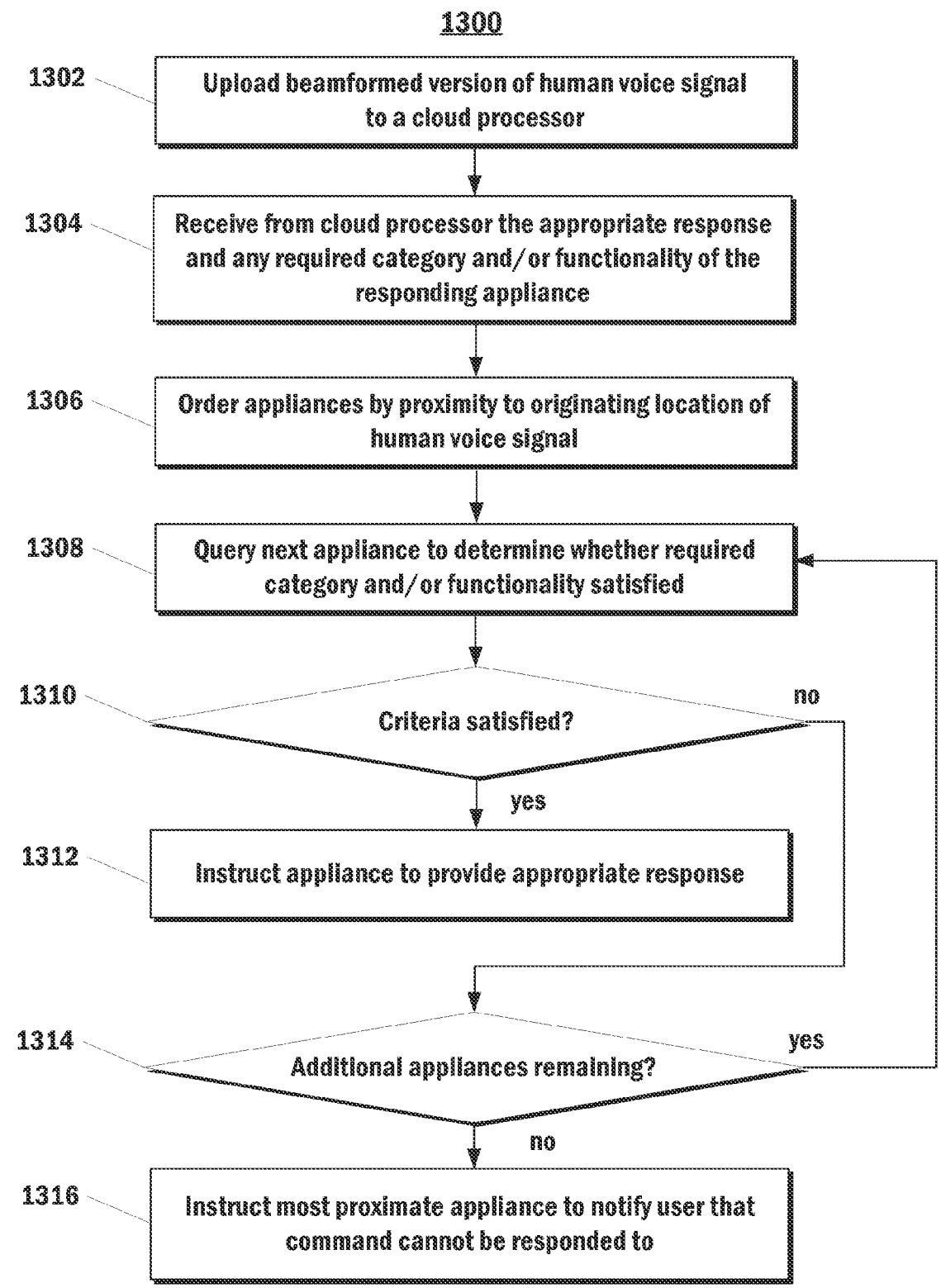
FIG. 13 depicts an exemplary method for responding to a human voice signal according to an exemplary embodiment of the present disclosure.

FIG. 13 depicts an exemplary method for responding to a human voice signal according to an exemplary embodiment of the present disclosure. Method (1300) can be implemented using any suitable appliance or other device, including, for example, appliance 110 of FIG. 1.

In addition, FIG. 13 depicts steps performed in a particular order for purposes of illustration and discussion. Those of ordinary skill in the art, using the disclosures provided herein, will understand that the various steps method (1300) can be omitted, adapted, and/or rearranged in various ways.

At (1302) the network master can upload a beamformed version of the human voice signal to a cloud processor.

At (1304) an appropriate response and any required appliance category and/or appliance functionality of a responding appliance can be received from the cloud processor.

As an example, if the voice command reads "Preheat to 375," then it can be determined that an appropriate response can only be performed by an oven. As another example, if the voice command requests display of a recipe, then only an appliance that includes a display will be appropriate for responding.

At (1306) the network master can order the appliances by proximity to the originating location of the human voice signal. For example, the location map can be used to determine the ordering.

At (1308) the network master can query the next appliance in the ordering to determine whether it satisfies any required category and/or functionality identified by the cloud processor response received at (1304).

At (1310) the network master can determine whether the appliance queried at (1308) satisfied all of the required criteria. For example, the queried appliance can provide a list of functionality and the network master can analyze the provided list (1310). As another example, the queried appliance can analyze its own functionalities and categorization and simply provide a Boolean response to the network master at (1310).

If the network master determines at (1310) that the appliance queried at (1308) does in fact satisfy all required criteria, then at (1312) the network master can instruct the appliance to provide an appropriate response. The network master can provide any required instructions or prompt so that the appliance performs the appropriate response.

However, if the network master determines at (1310) that the appliance queried at (1308) does not satisfy all required criteria, then at (1314) the network master can determine whether additional appliances remain in the ordering generated at (1306). If additional appliances do remain, the method (1300) can return to (1308) and query the next appliance in the ordering. In such fashion, each appliance, in order of proximity, is given an opportunity to respond to the voice command.

However, if it is determined at (1314) that additional appliances do not remain to be queried, then at (1316) the network master can instruct the most proximate appliance to the originating location to notify the user that the command cannot be properly responded to.

Figure 14:
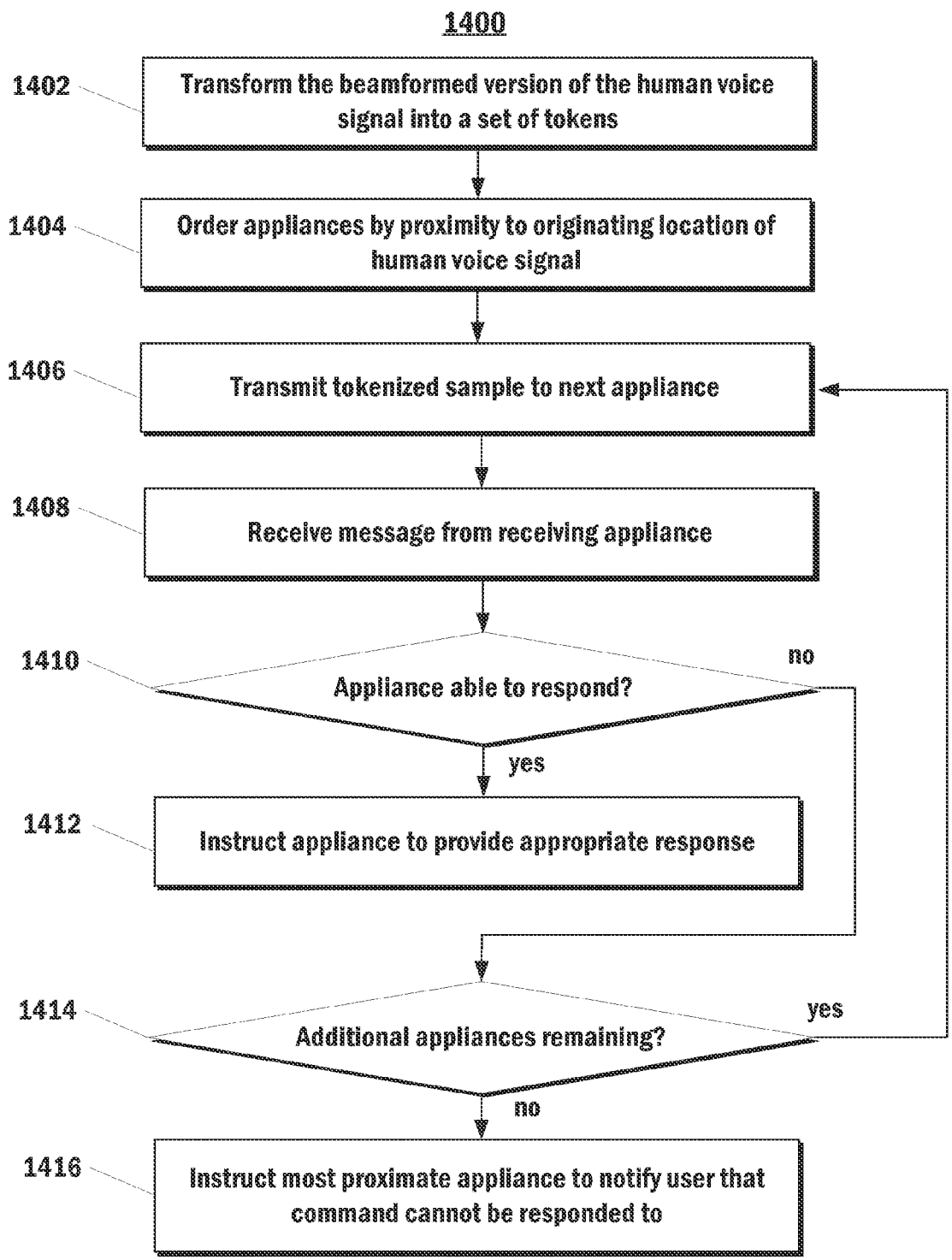
FIG. 14 depicts an exemplary method for responding to a human voice signal according to an exemplary embodiment of the present disclosure.

FIG. 14 depicts an exemplary method (1400) for responding to a human voice signal according to an exemplary embodiment of the present disclosure. Method (1400) can be implemented using any suitable appliance or other device, including, for example, appliance 110 of FIG. 1.

In addition, FIG. 14 depicts steps performed in a particular order for purposes of illustration and discussion. Those of ordinary skill in the art, using the disclosures provided herein, will understand that the various steps method (1400) can be omitted, adapted, and/or rearranged in various ways.

At (1402) the network master can transform a beamformed version of the human voice signal into a set of tokens. Exemplary tokens include a subject, a verb, an object or other suitable tokens.

At (1404) the network master can order the appliances by proximity to the originating location of the human voice signal. For example, the location map can be used to determine the ordering.

At (1406) the network master can transmit the tokenized sample to the next appliance in the ordering. At (1408) the network master can receive a response from the appliance to which it transmitted the tokenized sample at (1406). For example, the response can indicate whether the appliance suitably recognizes the provided tokens and is able to appropriately respond.

At (1410) it is determined whether the appliance to which the network master transmitted the tokenized message is able to respond. If the appliance is able to respond, then at (1412) the network master can instruct the appliance to provide an appropriate response. The network master can provide any required instructions or prompt so that the appliance performs the appropriate response.

However, if it is determined at (1410) that the appliance to which the network master transmitted the tokenized message is not able to respond, then at (1414) the network master can determine whether additional appliances remain in the ordering generated at (1404). If additional appliances do remain, then method (1400) can return to (1406) and transmit the tokenized sample to the next appliance in the ordering. In such fashion, each appliance, in order of proximity, is given an opportunity to comprehend the tokenized sample and respond to the voice command.

However, if it is determined at (1414) that additional appliances do not remain to be queried, then at (1416) the network master can instruct the most proximate appliance to the originating location to notify the user that the command cannot be properly responded to.

In such fashion, more intelligent and intuitive placement of responses to a user voice command can be provided in a multi-appliance environment.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a system to respond to a human voice signal, the system comprising a plurality of appliances, the method comprising:

connecting each of the plurality of appliances over a local area network;

generating a location map providing a location of each of the plurality of appliances;

receiving the human voice signal at a plurality of microphones respectively included in the plurality of appliances, wherein the human voice signal requests one or more appliance actions;

determining an originating location of the human voice signal based at least in part on the location map;

determining one or more functionalities required to complete the one or more requested appliance actions; and identifying the most proximate appliance to the originating location that is capable of performing the one or more functionalities to complete the one or more requested appliance actions, wherein identifying the most proximate appliance to the originating location that is capable of performing the one or more functionalities to complete the one or more requested appliance actions comprise:

generating an order of the plurality of appliances according to proximity to the originating location, wherein the order ranks the plurality of appliances from a first appliance that is most proximate to the originating location to a last appliance that is least proximate to the originating location;

transmitting a query to the first appliance in the order to determine whether the first appliance is capable of performing the one or more functionalities to complete the one or more requested appliance actions; and receiving from the first appliance a response to the query that indicates whether the first appliance is able to perform the one or more functionalities to complete the one or more requested appliance actions;

wherein said transmitting the query and said receiving the response are performed iteratively according to the order until the one of the appliances responds that such appliance is capable of performing the one or more functionalities to complete the one or more requested appliance actions.

2. The method of claim 1, wherein generating the location map providing the location of each of the plurality of appliances comprises:
   emitting, by each of the plurality of appliances, an audio signal;
   receiving, by each of the plurality of appliances, the audio signals emitted from the other appliances; and
   generating the location map based on one or more characteristics associated with the received audio signals.

3. The method of claim 2, wherein generating the location map based on one or more characteristics associated with the received audio signals comprises:
   determining, by each of the plurality of appliances, a direction of arrival for each received audio signal; and
   generating the location map based on the plurality of directions of arrival for each audio signal.

4. The method of claim 3, wherein determining, by each of the plurality of appliances, the direction of arrival for each received audio signal comprises calculating, by each of the plurality of appliances, the direction of arrival for each received audio signal based on a time difference in reception between two microphones included in such appliance, the two microphones having a known spatial configuration.

5. The method of claim 2, wherein generating the location map based on one or more characteristics associated with the received audio signals comprises:
   determining, for each audio signal, a plurality of distances from emittance respectively associated with the plurality of appliances, each distance from emittance for each appliance being based on a time of arrival of the audio signal at such appliance; and
   generating the location map based on the plurality of distances from emittance for each audio signal.

6. The method of claim 5, further comprising synchronizing a plurality of clocks respectively included in the plurality of appliances prior to instructing each of the plurality of appliances to emit an audio signal.

7. The method of claim 1, further comprising selecting one of the plurality of appliances to serve as a network master, the network master performing data processing for the system.

8. The method of claim 1, wherein determining the originating location of the human voice signal based at least in part on the location map comprises:
   determining, for each of the plurality of appliances, a direction of arrival of the human voice signal; and
   determining the originating location based on the plurality of directions of arrival and the location map.

9. The method of claim 8, wherein the direction of arrival of the human voice signal is determined for each of the plurality of appliances based on a time difference in reception between two microphones included in each appliance, the two microphones having a known spatial configuration.

10. The method of claim 1, wherein determining the originating location of the human voice signal based at least in part on the location map comprises determining the originating location of the human voice signal based on the location map and a plurality of respective times of arrival of the human voice signal at the plurality of appliances.

11. The method of claim 1, wherein receiving the human voice signal at the plurality of microphones comprises respectively generating a plurality of recorded voice waveforms at the plurality of appliances, the method further comprising, after determining the originating location of the human voice signal, performing a beamforming technique with respect to the plurality of recorded voice waveforms to spatially filter the human voice signal.

12. A system responding to a human voice signal, the system comprising:
   a plurality of appliances in communication over a local area network, each of the plurality of appliances comprising a processor, a memory, a speaker, and at least one microphone;
   wherein at least one of the plurality of appliances is configured to:
      generate a location map based on a plurality of audio signals respectively transmitted by the plurality of appliances, the location map describing a position for each of the plurality of appliances;
      receive a human voice signal that requests one or more appliance actions;
      determine an originating location of the human voice signal based at least in part on the location map;
      determine one or more functionalities required to complete the one or more requested appliance actions; and
      identify the most proximate appliance to the originating location that is capable of performing the one or more functionalities to complete the one or more requested appliance actions, wherein to identify the most proximate appliance to the originating location that is capable of performing the one or more functionalities, the at least one appliance is configured to:
         generate an order of the plurality of appliances according to proximity to the originating location, wherein the order ranks the plurality of appliances from a first appliance that is most proximate to the originating location to a last appliance that is least proximate to the originating location;
         transmit a query to the first appliance in the order to determine whether the first appliance is capable of performing the one or more functionalities to complete the one or more requested appliance actions; and
         receive from the first appliance a response to the query that indicates whether the first appliance is able to perform the one or more functionalities to complete the one or more requested appliance actions;
      wherein the at least one appliance transmits the query and receives the response iteratively according to the order until the one of the appliances responds that such appliance is capable of performing the one or more functionalities to complete the one or more requested appliance actions.

13. The system of claim 12, wherein:
   each of the plurality of appliances further comprises an internal clock;
   the plurality of appliances are configured to synchronize their internal clocks; and
   the at least one appliance is configured to generate the location map by performing operations, the operations comprising:
      sequentially prompting each of the plurality of appliances to transmit one of the plurality of audio signals with its speaker, such that the plurality of audio signals are respectively transmitted by the plurality of appliances over time;

receiving, for each transmitted audio signal, a time of arrival of such audio signal at each of the appliances that did not transmit such audio signal; and determining the position for each of the plurality of appliances based on a comparison of the plurality of times of times of arrival for each of the plurality of audio signals.

14. The system of claim 12, wherein:

each appliance comprises two microphones having a known spatial arrangement; and the at least one appliance is configured to generate the locatiot map by performing operations, the operations comprising:

sequentially prompting each of the plurality of appliances to transmit one of the plurality of audio signals with its speaker, such that the plurality of audio signals are respectively transmitted by the plurality of appliances over time;

receiving, for each transmitted audio signal, a direction of arrival of such audio signal from each of the appliances that did not transmit such audio signal; and determining the position for each of the plurality of appliances based on a comparison of the plurality of directions of arrival for each of the plurality of audio signals.

15. The system of claim 12, wherein the microphones of the plurality of appliances collectively form an array for receiving the human voice signal.

16. The system of claim 15, wherein at least one of the plurality of appliances is configured to generate a beamformed voice signal by performing a beamforming technique with respect to a plurality of voice waveforms respectively collected by the plurality of microphones.

17. A method for operating a system to respond to a human voice signal, the system comprising a plurality of appliances, the method comprising:

connecting each of the plurality of appliances over a local area network;

generating a location map providing a location of each of the plurality of appliances;

receiving the human voice signal at a plurality of microphones respectively included in the plurality of appliances, wherein the human voice signal requests one or more appliance actions;

determining an originating location of the human voice signal based at least in part on the location map;

determining one or more functionalities required to complete the one or more requested appliance actions; and identifying the most proximate appliance to the originating location that is capable of performing the one or more functionalities to complete the one or more requested appliance actions;

wherein identifying the most proximate appliance to the originating location that is capable of performing the one or more functionalities to complete the one or more requested appliance actions comprises:

generating an order of the plurality of appliances according to proximity to the originating location, wherein the order ranks the plurality of appliances from a first appliance that is most proximate to the originating location to a last appliance that is least proximate to the originating location;

transmitting a tokenized sample of the human voice signal to the first appliance in the order, wherein the tokenized sample comprises a set of tokens that are respectively representative of different grammatical portions of the human voice signal; and receiving a response from the first appliance that indicates whether the first appliance understands the tokenized sample and is able to perform the one or more functionalities to complete the one or more requested appliance actions;

wherein said transmitting the tokenized sample and said receiving the response are performed iteratively according to the order until the one of the appliances responds that such appliance is capable of performing the one or more functionalities to complete the one or more requested appliance actions.

18. The method of claim 17, further comprising, prior to transmitting the tokenized sample of the human voice signal:

transforming, by at least one of the plurality of appliances, the human voice signal into the tokenized sample.

* * * * *